US009477925B2

(12) United States Patent
Seide et al.

(10) Patent No.: US 9,477,925 B2
(45) Date of Patent: Oct. 25, 2016

(54) DEEP NEURAL NETWORKS TRAINING FOR SPEECH AND PATTERN RECOGNITION

(71) Applicant: Microsoft Corporation, Redmond, WA (US)

(72) Inventors: Frank Torsten Bernd Seide, Beijing (CN); Gang Li, Beijing (CN); Dong Yu, Bothell, WA (US); Adam C. Eversole, Redmond, WA (US); Xie Chen, LianYuan (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 13/682,372

(22) Filed: Nov. 20, 2012

(65) Prior Publication Data

US 2014/0142929 A1 May 22, 2014

(51) Int. Cl.
*G10L 11/00* (2006.01)
*G06N 3/08* (2006.01)
*G10L 15/06* (2013.01)

(52) U.S. Cl.
CPC .................. *G06N 3/08* (2013.01); *G10L 15/06* (2013.01)

(58) Field of Classification Search
CPC ........... G10L 15/16; G10L 2021/0575; G10L 21/0364; G10L 15/063; G10L 15/12; G10L 15/34; G10L 17/02; G10L 17/18; G10L 19/00; G10L 15/02; G10L 15/20; G10L 19/0018; G10L 19/0208; G10L 19/093; G10L 19/265; G10L 21/0272; G10L 25/18; G10L 25/30; G10L 25/90; G10L 25/93; G10L 15/10; G10L 25/00; G06F 17/30224; G06F 9/30036; G06F 9/50; G06F 11/0769; G06F 13/00

USPC ....... 704/1–10, 251, 255, 257, 242, 256, 16, 704/41, 232, 202; 706/31
See application file for complete search history.

(56) References Cited

U.S. PATENT DOCUMENTS

| | | | |
|---|---|---|---|
| 5,150,449 | A | 9/1992 | Yoshida et al. |
| 5,404,422 | A | 4/1995 | Sakamoto et al. |
| 5,687,286 | A | 11/1997 | Bar-Yam |
| 5,799,276 | A | 8/1998 | Komissarchik et al. |
| 5,862,519 | A | 1/1999 | Sharma et al. |

(Continued)

OTHER PUBLICATIONS

Abrash, et al., "Connectionist Speaker Normalization and Adaptation", Eurospeech, Sep. 1995, 4 pages.

(Continued)

*Primary Examiner* — Huyen Vo
(74) *Attorney, Agent, or Firm* — Sandy Swain; Judy Yee; Micky Minhas

(57) ABSTRACT

The use of a pipelined algorithm that performs parallelized computations to train deep neural networks (DNNs) for performing data analysis may reduce training time. The DNNs may be one of context-independent DNNs or context-dependent DNNs. The training may include partitioning training data into sample batches of a specific batch size. The partitioning may be performed based on rates of data transfers between processors that execute the pipelined algorithm, considerations of accuracy and convergence, and the execution speed of each processor. Other techniques for training may include grouping layers of the DNNs for processing on a single processor, distributing a layer of the DNNs to multiple processors for processing, or modifying an execution order of steps in the pipelined algorithm.

20 Claims, 5 Drawing Sheets

(56) References Cited

U.S. PATENT DOCUMENTS

| | | | |
|---|---|---|---|
| 6,128,609 | A | 10/2000 | Rose |
| 6,421,654 | B1* | 7/2002 | Gordon .......................... 706/16 |
| 6,539,368 | B1* | 3/2003 | Chernikov et al. ............. 706/41 |
| 6,574,597 | B1 | 6/2003 | Mohri et al. |
| 6,691,088 | B1 | 2/2004 | Blasig |
| 6,999,931 | B2 | 2/2006 | Zhou |
| 7,254,538 | B1 | 8/2007 | Hermansky et al. |
| 7,392,185 | B2 | 6/2008 | Bennett |
| 7,444,282 | B2 | 10/2008 | Choo et al. |
| 7,689,419 | B2 | 3/2010 | Mahajan et al. |
| 7,720,683 | B1 | 5/2010 | Vermeulen et al. |
| 2004/0243412 | A1 | 12/2004 | Gupta et al. |
| 2004/0260550 | A1 | 12/2004 | Burges et al. |
| 2006/0116877 | A1 | 6/2006 | Pickering et al. |
| 2008/0319933 | A1* | 12/2008 | Moussa et al. ................ 706/31 |
| 2009/0055336 | A1* | 2/2009 | Chen ................ G06F 17/30017 706/20 |
| 2009/0132253 | A1 | 5/2009 | Bellegarda |
| 2009/0216528 | A1 | 8/2009 | Gemello et al. |
| 2009/0287624 | A1 | 11/2009 | Rouat et al. |
| 2010/0049503 | A1 | 2/2010 | Kempe et al. |
| 2010/0057435 | A1 | 3/2010 | Kent et al. |
| 2010/0057453 | A1 | 3/2010 | Valsan |
| 2010/0178956 | A1 | 7/2010 | Safadi |
| 2012/0065976 | A1 | 3/2012 | Deng et al. |
| 2012/0072215 | A1 | 3/2012 | Yu et al. |
| 2012/0089392 | A1 | 4/2012 | Larco et al. |
| 2012/0134548 | A1 | 5/2012 | Rhoads et al. |

OTHER PUBLICATIONS

Baker, et al., "Research Developments and Directions in Speech Recognition and Understanding, Part 1", IEEE Signal Processing Magazine, vol. 75, May 2009, 6 pages.

Baker, et al., "Updated Minds Report on Speech Recognition and Understanding, Part 2", IEEE Signal Processing Magazine, vol. 78, Jul. 2009, 9 pages.

Bengio, et al., "Greedy Layer-Wise Training of Deep Networks", Conference on Neural Information Processing Systems (NIPS 2006), Dec. 2006, 8 pages.

Bergen, et al., "A Senone Based Confidence Measure for Speech Recognition", retrieved at <<http://citeseerx.ist.psu.edu/viewdoc/download?doi=10.1.1.57.915&rep1&type=pdf>>, Sep. 1997, 4 pages.

Bilmes, et al., "A Review of Graphical Model Architectures for Speech Recognition", retrieved at <<http://citeseerx.ist.psu.edu/viewdoc/download?doi=10.1.80.8512&rep=rep1&type=pdf>>, May 2005. 23 pages.

Bourlard, et al., "REMAP Recursive Estimation and Maximization of a Posteriori Probabilities in Connectionist Speech Recognition", Retrieved at <<http://www.icsi.berkeley.edu/ftp/pub/speech/papers/euro95-remap.pdf>>, 1995, 4 pages.

Bridle, et al., "An Alphanet Approach to Optimising Input Transformations for Continuous Speech Recognition", International Conferenc on Acoustics, Speech, and Signal Processing (ICASSP-91), Apr. 1991, pp. 277-280.

Chen, et al., "Using Deep belief Nets for Chinese Named Entity Categorization", Proceedings of the 2010 Named Entities Workshop, Jul. 2010, pp. 102-109.

Chong, et al., "Scalable HMM Based Inference Engine in Large Vocabulary Continuous Speech Recognition", Proceedings of IEEE International Conference on Multimedia and Expo (ICME'09), Jun.-Jul. 2009, 4 pages.

Notice on the First Offic eAction, The State Intellectual Property Office of the People's Republic of China, mailed Oct. 25, 2012 for Application No. 201110299678.0, 6 pages.

Dahl, et al., "Context Dependent Pre Trained Deep Neural Networks for Large-Vocabulary Speech Recognition", IEEE Transactions on Audio, Speech, and Language Processing, vol. 20, No. 1, Jan. 2012, pp. 30-42.

Deng, et al., "Binary Coding of Speech Spectograms Using Deep Auto-Encoder", Interspeech 2010, Sep. 2010, pp. 1692-1695.

Deng, et al., "Structured Speech Modeling", IEEE Transactions on Audio, Speech, and Language Processing, vol. 14, No. 5, Sep. 2006, pp. 1492-1504.

Deselaers, et al., "A Deep Learning Approach to Machine Transliteration", Proceedings of the Fourth Workshop on Statistical Machine Translation, Mar. 2009, pp. 233-241.

Duch, et al., "Optimization and global minimization methods suitable for neural networks", Neural Computing Surveys, vol. 2, Dec. 1998, 41 pages.

Fiscus, et al., "2000 NIST Evaluation of Conversaional Speech Recognition Over the Telephone: English and Mandarin Performance Results", National Institute of Standards and Technology (NIST), Information Technology Laboratory (ITL), Gaithersburg, MD, May 2000, 9 pages.

Franco, et al., "Context-Dependent Connectionist Probability Estimation in a Hybrid HMM-Neural Net Speech Recognition", Computer Speech and Language, vol. 8, Jul. 1994, 24 pages.

Fritsch, et al., "ACID/HNN: Clustering Hierarchies of Neural Networks for Context-Dependent Connectionist Acoustic Modeling", Proceedings of the IEEE International Conferenc on Acoustics, Speech and Signal Procesing, May 1998, pp. 505-508.

Gales, "Maximum Likelihood Linear Transforms for HMM-Based Speech Recognition", CUED/F-InFeng/TR 291, retrieved from <<www.ee.columbia.edu/~dpwe/papers/Gales97-mllr.pdf>>, May 1997, 20 pages.

Godfrey, et al., "Switchboard-1 Release 2", in Linguistic Data Consortium, 1997, retreived from <<http://www.ldc.upenn.edu/Catalog/CatalogEntry.jsp?catalogId=LDC97S62>> on Jul. 13, 2011, 2 pages.

Hamel, et al., "Automatic Identification of Instrument Classes in Polyphonic and Poly-Instrument Audio", retrieved at <<http://ismir2009.ismir.net/proceedings/PS3-2.pdf>>, Oct. 2009, 6 pages.

Hassibi, et al., "Second Order Derivatives for Network Pruning: Optimal Brain Surgeon", Advances in Neural Information Processing Systems (NIPS), Nov.-Dec. 1992, 8 pages.

He, et al., "Discriminative Learning in Sequential Pattern Recognition", IEEE Signal Processing Magazine, vol. 14, Sep. 2008, 23 pages.

Hinton, et al., "A fast learning algorithm for deep belief nets", Neural Computation 2006, vol. 18, Issue 7, Jul. 2006, 16 pages.

Hinton, "A Practical Guide to Training Restricted Boltzmann Machines", Technical Report UTML TR Mar. 2010, retrieved from <<http://www.cs.toronto.edu/~hinton/absps/guideTR.pdf>>, Aug. 2010, 21 pages.

Hinton, et al., "Reducing the Dimensionality of Data with Neural Networks", Science, vol. 313, No. 5786, Jul. 2006, pp. 504-507.

International Search Report, Mailed Jan. 4, 2012 for Application No. PCT/US2011/050472, Filed Date Sep. 6, 2011, 9 pages.

International Search Report, Mailed Mar. 21, 2012 for Application No. PCT/US2011/050738, Filed Date Sep. 7, 2011, 9 pages.

Kershaw, "Phonetic Context-Dependency in a Hybrid ANN/HMM Speech Recognition System", Dissertation Submitted to the University of Cambridge, Jan. 1997, 127 pages.

Kingsbury, "Lattice-Based Optimization of Sequence Classification Criteria for Neural-Network Acoustic Modeling", IEEE International Conference on Acoustics, Speech and Signal Processing (ICASSP2009), Apr. 2009, pp. 3761-3764.

Kirchhoff, "Combining Articulatory and Acoustic Information for Speech Recognition in Noisy and Reverberant Environments", International Conference on Spoken Language Processing, Nov. 1998, 4 pages.

Langford, et al., "Sparse Online Learning via Truncated Gradient", Journal of Machine Learning Research, vol. 10, Mar. 2009, pp. 777-801.

Larochelle, et al., "An Empirical Evaluation of Deep Architectures on Problems with Many Factors of Variation", Proceedings if the 24th International Conference on Machine Learning, Jun. 2007, 8 pages.

Le Roux, et al., "Deep Belief Networks are compact universal approximators", Journal Neural Computation, vol. 22, Issue 8, Aug. 2010, 19 pages.

(56) References Cited

OTHER PUBLICATIONS

LeCun, et al., "Optimal Brain Damage", Advances in Neural Information Processing Systems, NIPS1989, Nov. 1989, 8 pages.
Lee, et al., "Sparse deep belief net model for visual area V2", retrieved at <<http://ai.stanford.edu/~ang/papers/nips07-sparsedeepbeliefnetworkv2.pdf>>, Dec. 2007, 8 pages.
Lee, et al., "Unsupervised feature learning for audio classification using convolutional deep belief networks", NIPS 2009, Dec. 2009, 9 pages.
Mohamed, et al., "Deep Belief Networks for Phone Recognition", retrieved at <<www.cs.toronto.edu/~gdahl/papers/dbnPhoneRec.pdf>>, May 2009, 9 pages.
Mohamed, et al., "Deep Belief Networks Using Discriminative Features for Phone Recognition", IEEE International Conference on Acoustics, Speech and Signal Processing (ICASSP, May 2011, 4 pages.
Mohamed, et al., "Phone Recognition Using Restricted Boltzmann Machines", IEEE International Conference on Acoustics Speech and Signal Processing (ICASSP), Mar. 2010, 4 pages.
Morgan, et al., "Pushing the Envelope—Aside", IEEE Signal Processing Magazine, vol. 22, Issue 5, Sep. 2005, pp. 81-88.
Peterson, et al., "A Mean Field Theory Learning Algorithm for Neural Networks", Complex Systems, vol. 1, 1987, pp. 995-1019.
Renals, et al., "Connectionist Probability Estimators in HMM Speech Recognition", IEEE Transactions on Speech and Audio Processing, vol. 2, No. 1, Part II, Jan. 1994, pp. 161-174.
Rumelhart, et al., "Learning Representations by Back-Propagating Errors", Nature, vol. 323, Oct. 1986, pp. 553-536.
Salakhutdinov, et al., "On the Quantitative Analysis of Deep Belief Networks", Proceedings of the 25th International Conference on Machine Learning, Jul. 2008, 8 pages.
Saon, et al., "Maximum Likelihood Discriminant Feature Spaces", Proceedings of the IEEE International Conference on Acoustics, Speech and Signal Processing, Jun. 2000, 4 pages.
Saul, et al., "Mean Field Theory for Sigmoid Belief Networks", Journal of Artificial Intelligence Research, vol. 4, Mar. 1996, pp. 61-76.
Scanzio, et al., "Parallel Implementation of Artificial Neural Network Training", IEEE International Conference on Acoustics, Speech and Signal Processing (ICASSP2010), Mar. 2010, pp. 4902-4905.
Schwarz, et al., "Hierarchical Structures of Neural Networks for PHONEME Recognition", Proceedings of the IEEE International Conference on Acoustics, Speech and Signal Processing (ICASSP), May 2006, 4 pages.
Seide, et al., "Conversational Speech Transcription Using Context-Dependent Deep Neural Networks", INTERSPEECH 2011, Aug. 2011, pp. 437-440.
Seide, et al., "Feature engineering in Context Dependent Deep Neural Networks for Conversational Speech Transcription", IEEE Automatic Speech Recognition and Understanding Workshop (ASRU2011), Dec. 2011, pp. 24-29.
Stolcke, et al., "Recent Innovations in Speech-to-Text Transcription at SRI-ICSI-UW", IEEE Transactions on Audio, Speech, and Language Processing, vol. 14, No. 5, Sep. 2006, pp. 1-16.
Yu, et al., "A Novel Framework and Training Algorithm for Variable-Parameter Hidden Markov Models", IEEE Transactions on Audio, Speech, and Language Processing, vol. 17, No. 7, Sep. 2009, pp. 1348-1360.
Yu, et al., "Automated Directory Assistance System—from Theory to Practice", 8th Annual Conference of the International Speech Communication Association (INTERSPEECH 2007), Aug. 2007, pp. 2709-2712.
Yu, et al., "Deep Learning and its Applications to Signal and Information Processing", IEEE Signal Processing Magazine, vol. 28, No. 1, Jan. 2011, pp. 145-154.
Yu, et al., "Deep-Structured Hidden Conditional Random Fields for Phonetic Recognition", Interspeech 2010, Sep. 2010, pp. 2986-2989.
Yu, et al., "Exploiting Sparseness in Deep Neural Networks for Large Vocabulary Speech Recognition", IEEE International Conference on Acoustic, Speech and Signal Processing, Mar. 2012, pp. 4409-4412.
Yu, et al., "Language Recognition Using Deep-Structured Conditional Random Fields", ICASSP2010, Mar. 2010, pp. 5030-5033.
Yu, et al., "Learning in the Deep-Structured Conditional Random Fields", Conference on Neural Information Processing Systems (NIS, 2009), Dec. 2009, 8 pages.
Yu, et al., "Roles of Pre-Training and Fine-Tuning in Context-Dependent DBN-HMMs for Real-World Speech Recognition", NIPS 2010 Workshop on Deep Learning and Unsupervised Feature Learning, Dec. 2010, 8 pages.
Yu, et al., "Solving Nonlinear Estimation Problems Using Splines", IEEE Signal Processing Magazine, vol. 26, Issue 4, Jul. 2009, pp. 86-90.
Zhan, Vocal Tract Length Normalization for Large Vocabulary Continuous Speech Recognition, Technical Report CMU-CS-97-148, retrieved at <<http://citeseerx.ist.psu.edu/viewdoc/download?doi=10.1.1.45.2780&rep=rep1&type=pdf>>, May 1997, 20 pages.
Zweig, et al., "A Segmental CRF Approach to Large Vocabulary Continuous Speech Recognition", IEEE Workshop on Automatic Speech Recognition and Understanding (ASRU2009), Dec. 2009, pp. 152-157.

\* cited by examiner

DEEP NEURAL NETWORKS TRAINING FOR SPEECH AND PATTERN RECOGNITION

BACKGROUND

Acoustic modeling techniques that use context-dependent deep neural network hidden Markov models (CD-DNN-HMMs) for speech recognition or speech-to-text transcription can outperform acoustic modeling techniques that use conventional Gaussian-mixture based HMMs. Unlike Gaussian-mixture based HMMs, CD-DNN-HMMs use artificial neural networks with multiple hidden layers to directly model tied context-dependent states. However, the training of CD-DNN-HMMs for use in speech recognition is generally more time consuming that the training of Gaussian-mixture based HMMs. This larger amount of training time for CD-DNN-HMMs is a major obstacle to the widespread adoption and use of CD-DNN-HMMs for speech recognition.

The training of conventional Gaussian-mixture based HMMs for speech recognition may be optimized via parallelization. For example, the Baum-Welch training of Gaussian-mixture based HMMs may include statistics collection that is parallelized over hundreds or even thousands of servers. In such training, speech utterances may be processed independently across multiple servers. At the end of a batch of hundreds of millions of frames, partial statistics from the servers may be merged, and an updated model may be distributed to the servers. However, techniques for training Gaussian-mixture based HMMs are inapplicable to the training of CD-DNN-HMMs due to differences in model type, training procedures, and computation resource usage.

SUMMARY

Described herein are enhanced techniques for training deep neural networks (DNN), herein referred to as DNNs, to speed up the training of the DNNs for use in performing pattern recognition and data analysis, such as speech recognition. In various embodiments, the DNNs may be context-dependent DNNs or context-independent DNNs. In some instances, such as for speech recognition, the context-dependent DNNs may be used in conjunction with hidden Markov Models (HMMs). In such instances, the combination of context-dependent DNNs and HMMs is known as context-dependent DNN-HMMs (CD-DNN-HMMs). Thus, the techniques described herein for training DNNs may be applied to train the CD-DNN-HMMs. The techniques described herein may include the use of a pipelined algorithm to parallelize the training of the DNNs across multiple multi-core processors, such as multiple general-purpose graphics processing units (GPGPUs). Accordingly, multiple layers of DNNs may be processed in parallel on the multiple multi-core processors. Further, the pipelined algorithm may be configured to process input data sample batches having a size that is defined to optimize a tradeoff between computation accuracy and execution efficiency.

The techniques may further include the use of model striping. In model striping, the top layer, which is the output layer of the DNNs, may be processed in parallel across multiple multi-core processors. Load balancing multiple layers of the DNNs across different multi-core processors may be another technique that is implemented. Other techniques may include the use of pipeline roundtrip reduction and parallelized data transfer with computation during the execution of the pipelined algorithm.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are enhanced techniques for training the deep neural networks (DNNs), herein referred to as DNNs. In various embodiments, the DNNs may be context-dependent DNNs or context-independent DNNs. In some instances, such as for speech recognition, the context-dependent DNNs may be used in conjunction with hidden Markov Models (HMMs). In such instances, the combination of context-dependent DNNs and HMMs is known as context-dependent DNN-HMMs (CD-DNN-HMMs). Thus, the techniques described herein for training DNNs may be applied to train the CD-DNN-HMMs. The training of the DNNs as described herein may be used to speed up the preparation of the DNNs for use in performing pattern recognition and data analysis, such as speech recognition. The techniques may include the use of a pipelined algorithm to parallelize the training of the DNNs across multiple multi-core processors, such as multiple general-purpose graphics processing units (GPGPUs). In at least one implementation, the multi-core processors may exchange data through an internal interface bus (e.g. PCIe), rather than a network. Accordingly, multiple layers of the DNNs may be processed in parallel on the multiple multi-core processors. Further, the pipelined algorithm may be configured to process input data sample batches having a size that is defined to optimize a tradeoff between computation accuracy and execution efficiency. In other words, the size may maximize both computation accuracy and execution efficiency of the pipelined algorithm 110.

The training techniques may further include the use of model striping. In model striping, the top layer, which is the output layer of the DNNs, may be processed in parallel across multiple multi-core processors. Load balancing multiple layers of the DNNs across different multi-core processors may be another training technique that is implemented. Other techniques may include the use of pipeline roundtrip reduction and parallelized data transfer with computation during the execution of the pipelined algorithm. The model striping of a top layer may be applied more frequently in the training of context-dependent DNNs because in context-independent DNNs the top layer size is typically much smaller than that in the context-dependent DNNs.

The techniques may reduce the amount of time used to train the DNNs for a particular purpose, such as for speech recognition. The decreased training time may lead to an increase in the implementation and usage of the DNNs in performing speech-to-text transcription or text-to-speech synthesis. Various examples of techniques for training of the DNNs for data analysis in accordance with various embodiments are described below with reference to FIGS. 1-5.

Example Scheme

Figure 1:
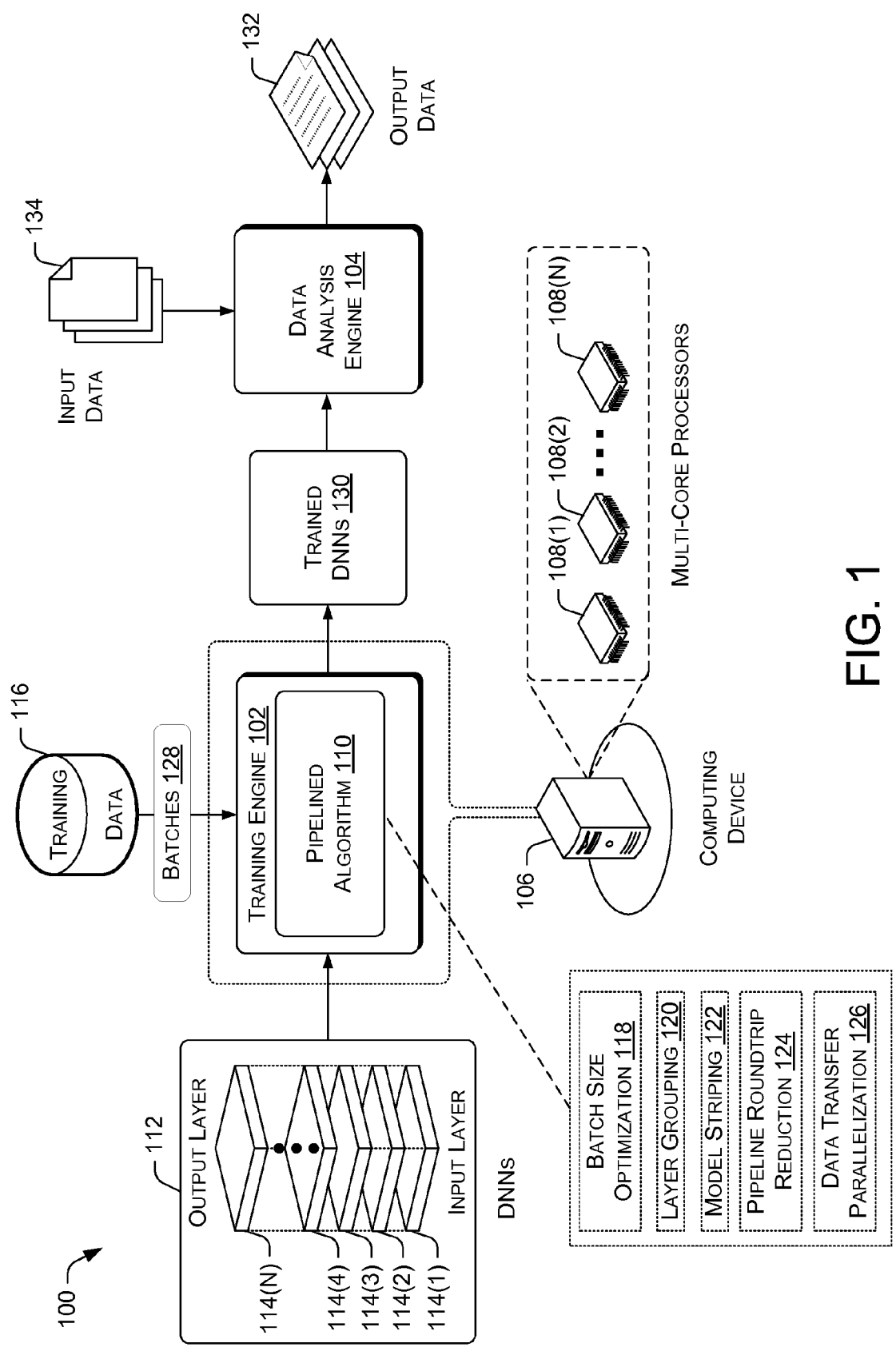
FIG. 1 is a block diagram that illustrates an example scheme for implementing a training engine that uses a pipelined algorithm to train DNNs.

FIG. 1 is a block diagram that illustrates an example scheme 100 for implementing a training engine that uses a pipelined algorithm to train DNNs. The example scheme 100 may include a training engine 102 and a data analysis engine 104. The training engine 102 may be running on a computing device 106. The computing device 106 may include multiple multi-core processors 108(1)-108(N). In some embodiments, each of the multi-core processors 108(1)-108(N) may be a general-purpose graphics processing unit (GPGPU). In other embodiments, each of the multi-core processors 108(1)-108(N) may be a field-programmable gate array (FPGA), or another type of customizable multi-core processor. The multi-core processors 108(1)-18(N) may exchange data through an internal bus, such as a peripheral component interconnect express (PCIe) bus. However, in additional embodiments, one or more of the multi-core processors 108 may be substituted with a single-core processor in some instances.

The training engine 102 may use a pipelined algorithm 110 to train DNNs 112 for performing data analysis, such as for use in speech recognition. The DNNs 112 may be a multi-layer perceptron (MLP). As such, the DNNs 112 may include a bottom input layer 114(1) and a top layer 114(N), as well as multiple hidden layers, such as the multiple layers 114(2)-114(4), in which N denotes any integer. In some embodiments, the context dependent DNNs 112 may include a total of eight layers. Accordingly, in such embodiments, the value of N is "8" as there are eight layers. In various embodiments, the DNNs 112 may be context-dependent DNNs or context-independent DNNs. Training data 116 may be used by the pipelined algorithm 110 as training data to train the DNNs 112. The training data 116 may be a speech corpus that includes a collection of sample speech from human speakers. For example, the speech corpus may include North American English speech samples collected from speakers of North American English in the United States and Canada. However, in other implementations, the training data 116 may include sample speech in other respective languages (e.g., Chinese, Japanese, French, etc.), depending on the desired language of the speech to be recognized, or other kinds of training data for entirely different applications like handwriting or images.

The computations performed by the pipelined algorithm 110 may be parallelized across the multi-core processors 108(1)-108(N). For example, during pipelined back-propagation, a computation on input data performed by the multi-core processor 108(1) may produce a first computation result. The first computation result may be pipelined to the multi-core processor 108(2) for further computation to generate a second computation result. However, concurrent with the generation of the second computation result, the multi-core processor 108(1) may be processing additional input data to generate a third computation result. Such concurrent computations by the multi-core processors 108(1)-108(N) may result in a pipelining of computations that train the DNNs 112, and, accordingly, to a reduction of computation time due to the resulting parallelism of computation.

In various embodiments, the computations performed by the pipelined algorithm 110 may be enhanced using one or more techniques, such as batch size optimization 118, layer grouping 120, model striping 122, pipeline roundtrip reduction 124, and data transfer parallelization 126. Since the training data 116 is processed by the pipelined algorithm as batches of input samples 128, batch size optimization 118 may include configuring the size of each input sample batch to optimize a tradeoff between computation accuracy and execution efficiency.

Further, the layers 114(1)-114(N) in the DNNs 112 may have varying sizes due to differences in the number of units in each layer. Thus, layer grouping 120 is the grouping of at least two layers of the layers 114(1)-114(N) for executing by a single multi-core processor for the purpose of load balancing. For example, a largest layer in the DNNs 112 may have a size that is ten times larger than that of the one or more smallest layers. Accordingly, it may be more efficient to devote a particular multi-core processor to process the largest layer, while processing two or more of the smallest layers on another multi-core processor. Such grouping may further eliminate some pipeline roundtrip delays and improve efficiency.

Model striping 122 is the parallelized processing of a particular layer of the DNNs 112 across multiple multi-core processors, such as a plurality of the processors of the multi-core processors 108(1)-108(N). For example, the top layer 114(N) of the DNNs 112 may have a size that is ten times larger than that of the next largest layer in the DNNs 112. Accordingly, the processing of the top layer 114(N) may be paralleled across multiple multi-core processors. In this way, the model striping 122 of the top layer 114(N) may reduce the execution time of the pipelined algorithm 110 for training the DNNs 112.

A computation iteration of the pipelined algorithm 110 may execute the following steps in sequence: forward propagation of input data, error back propagation, and model update. However, pipeline roundtrip reduction 124 is based on the execution of a model update step before a forward propagation step during one or more computation iterations. The execution of the model update step before the forward propagation step may reduce pipeline roundtrip delay, which may in turn reduce the overall execution time of the pipelined algorithm 110 in completing the training. Additionally, data transfer parallelization 126 may include parallelizing the streaming of the output data from a computation iteration of the pipelined algorithm 110 with other steps in the computation iteration. In instances in which streaming time is shorter than computation time, such parallelization may reduce or eliminate time delay due to the exchange of data between multi-core processors during execution of the pipelined algorithm 110.

Thus, by using the pipelined algorithm 110 and the training data 116, the training engine 102 may produce trained DNNs 130 from the DNNs 112. In turn, the data analysis engine 104 may use the trained DNNs 130 to produce output data 132 from the input data 134. In some implementations, the data analysis engine 104 may be a speech-to-text engine that uses the trained DNNs 130 in the form of trained context-dependent DNN-HMMs. The speech-to-text engine may use the trained context-dependent DNN-HMMs to produce output data 132 in the form of output text from the input data 134 that is in the form of input speech. The data analysis engine 104 may be executed on the computing device 106 or a computing device that is similar to the computing device 106. Moreover, the data analysis engine 104 may receive live input data 134 from a microphone and audio processing components of the computing device. Alternatively, the data analysis engine 104 may receive input data 134 from a media file or stream, for example for the purpose of audio-indexing of the spoken content in said media file/stream. In other embodiments, the data analysis engine 104 may also be a text-to-speech engine that uses the trained context-dependent DNNs to synthesize output speech based on input text.

In alternative embodiments, the pipelined algorithm 110, as enhanced with one or more of the techniques 118-126, may be implemented to produce trained context-independent DNNs 130 under other scenarios that exhibit similar characteristics. In this way, context-independent forms of the DNNs 112 may be trained with appropriate training data for a variety of other data analysis purposes. The characteristics may include a larger set of training data that results in prolonged processing time (e.g., greater than 50 million samples), the implementation of DNNs in which the output of each network of the DNNs exceeds a threshold (e.g., greater than four thousand data outputs), and/or so forth. The data analysis purposes may include using trained context-independent DNNs for activities such as image recognition, computer vision, video tracking, and/or so forth.

Example Components

Figure 2:
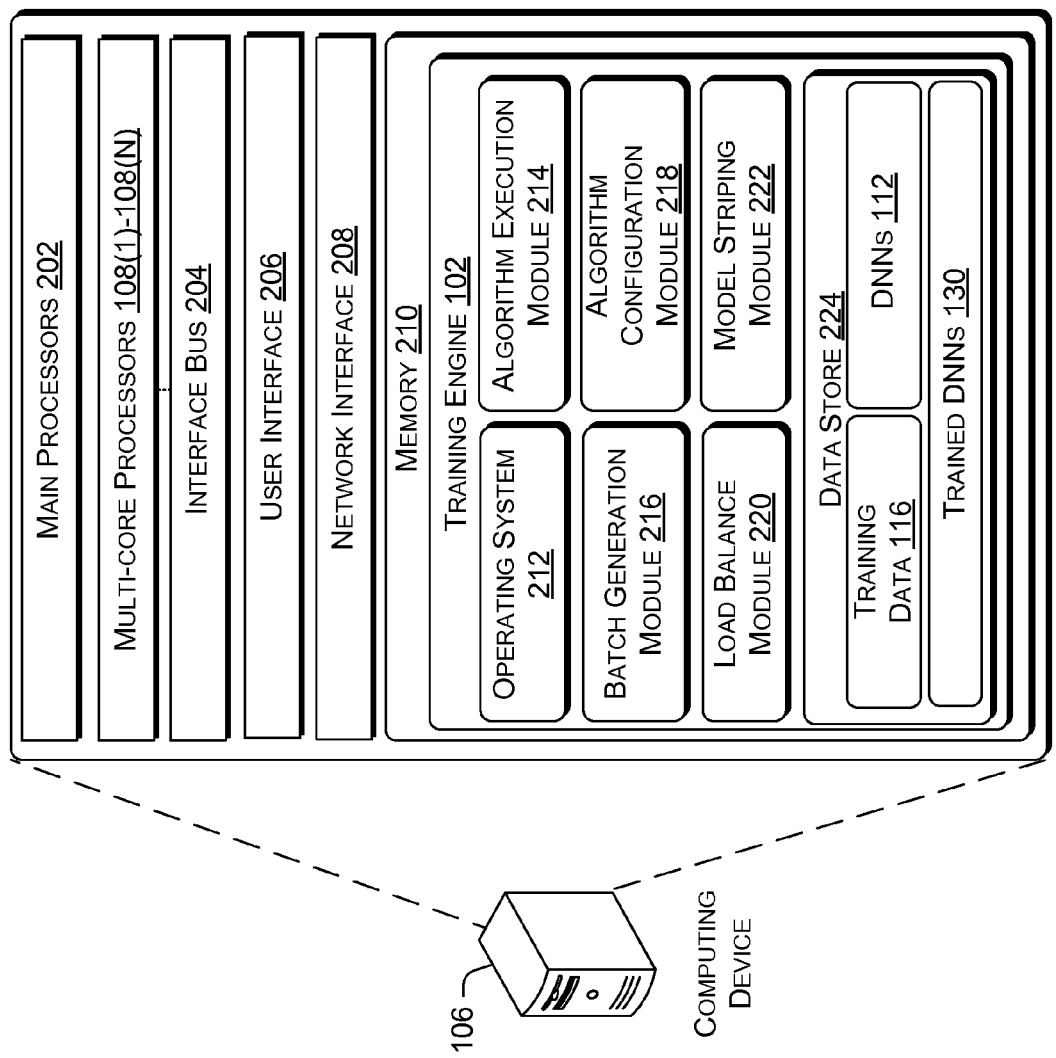
FIG. 2 is an illustrative diagram that shows example components of the training engine that uses a pipelined algorithm to train the DNNs.

FIG. 2 is an illustrative diagram that shows example components of the computing device 106 that implements the training engine 102 to train the DNNs 112. In various embodiments, the DNNs 112 may be context-dependent DNNs or context-independent DNNs. The computing device 106 may include one or more main processors 202, a plurality of multi-core processors 108(1)-108(N), an interface bus 204, a user interface 206, a network interface 208, and memory 210. In various embodiments, the computing device 106 may be a server, a desktop computer, another type of electronic device, or a combination of the above that is capable of hosting multiple multi-core processors to process data.

Each of the main processors 202 may be a single-core processor or a multi-core processor. The main processors 202 may be responsible for executing an operating system that is installed on the computing device 106. In some embodiments, each of the multi-core processors 108(1)-108(N) may be a general-purpose graphics processing unit (GPGPU). In other embodiments, each of the multi-core processors 108(1)-108(N) may be a field-programmable gate array (FPGA), or another type of customizable processor. In still other embodiments, the multi-core processors 108(1)-108(N) may be a heterogeneous mixture of multiple types of processors. For example, the multi-core processors 108(1)-108(N) may be a combination of one or more GPGPUs and one or more FPGAs. The multi-core processors 108(1)-18(N) may exchange data through the interface bus 204. For example, the interface bus 204 may be a peripheral component interconnect express (PCIe) bus. In some implementations, the main processors 202 and the multi-core process 108(1)-108(N) may be the same processors.

The user interface 206 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The network interface 208 may include wireless and/or wireless communication interface components that enable the computing device 106 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct I/O interface, such as an Ethernet interface, a serial interface, a Universal Serial Bus (USB) interface, and/or so forth. As such, the computing device 106 may have network capabilities. For example, the computing device 106 may exchange data with other electronic devices (e.g., laptops computers, servers, etc.) via one or more networks, such as the Internet.

The memory 210 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 210 of the computing device 106 may store the modules of the training engine 102. The modules may include an operating system 212, an algorithm execution module 214, a batch generation module 216, an algorithm configuration module 218, a load balance module 220, and a model striping module 222. Additionally, a data store 224 may reside in the memory 210.

The operating system 212 may include components that enable the computing device 106 to receive data via various inputs (e.g., user controls, network interfaces, and/or memory devices), and process the data using the main processors 202 to generate output. The operating system 212 may further include one or more components that present the output (e.g., display an image on an electronic display, store data in memory, transmit data to another electronic device, etc.). The operating system 212 may enable a user to interact with modules of the training engine 102 using the user interface 206. Additionally, the operating system 212 may include other components that perform various other functions generally associated with an operating system.

The algorithm execution module 214 may use the pipelined algorithm 110 to train the DNNs 112 based on the training data 116, which may be a speech corpus. In instances in which the DNNs 112 are trained for speech analysis purposes, the DNNs 112 may be context-dependent DNNs that are used in conjunction with HMMs. However, in other instances in which the DNNs are trained for other types of data analysis, the DNNs may be context-independent DNNs. The DNNs 112 may be a MLP that models the posterior probability $P_{s|o}(s|o)$ of a class s, given an observation vector o, as a stack of (L+1) layers of log-linear models. The first L layers, l=0 ... L−1, model posterior probabilities of hidden binary vectors $h^l$ given input vectors $v^l$, while the top layer L models the desired class posterior as:

$$P^l_{h|v}(h^l \mid v^l) = \prod_{j=1}^{N^l} \frac{e^{z^l_j(v^l) \cdot h^l_j}}{e^{z^l_j(v^l) \cdot 1} + e^{z^l_j(v^l) \cdot 0}}, 0 \le l < L \quad (1)$$

$$P^L_{s|v}(s \mid v^L) = \frac{e^{z^L_s(v^L)}}{\sum_{s'} e^{z^L_{s'}(v^L)}} = \mathrm{softmax}_s(z^L(v^L)) \quad (2)$$

$$z^l(v^l) = (W^l)^T v^l + a^l; \; v^l \stackrel{\mathrm{def}}{=} E^{l-1}\{h^{l-1}\} \quad (3)$$

with weight matrices $W^l$ and bias vectors $a^l$, where $h^l_j$ and $z^l_j(v^l)$ are the j-th component of $h^l$ and $z^l$ ($v^l$), respectively. Full out-summation over all hidden variables, which is infeasible, may be approximated by a "mean-field approximation" where the input $v^l$ to each hidden layer is taken as the expectation of the output vector $h^l$ of the previous layer. Further, for use with the DNNs 112, state posteriors $P_{s|o}(s|o)$ may be converted to scaled likelihoods by dividing by their prior.

Accordingly, the algorithm execution module 214 may train the DNNs 112 according to the following cross entropy criterion:

$$D = \sum_{t=1}^{T corpus} \log P_{s|o}(s(t)|o(t)), \quad (4)$$

by using stochastic gradient descent:

$$(W^l, a^l) \leftarrow (W^l, a^l) + \varepsilon \frac{\partial D}{\partial (W^l, a^l)}, 0 \le l \le L, \quad (5)$$

with learning rate $\varepsilon$ and gradients as follows:

$$\frac{\partial D}{\partial W^l} = \sum_t v^l(t)(\omega^l(t)e^l(t)); \frac{\partial D}{\partial a^l} = \sum_t \omega^l(t)e^l \quad (6)$$

$$e^L(t) = (\log \mathrm{softmax})'(z^L(v^L(t))) \quad (7)$$

$$e^{l-1}(t) = W^l \cdot e^l(t) \cdot e^l(t) \text{ for } 0 \le l < L \quad (8)$$

$$\omega^l(t) = \begin{cases} \mathrm{diag}(\sigma'(z^l(v^l(t))) & \text{for } 0 \le l < L \\ 1 & \text{else} \end{cases} \quad (9)$$

and with error signals $e^l(t)$, the component-wise derivatives $\sigma'_j(z) = \sigma_j(z) \cdot (1 - \sigma_j(z))$, and $(\log \mathrm{softmax})'_j(z) = \delta_{s(t),j} - \mathrm{softmax}_j(z)$, and Kronecker delta $\delta$.

The training of the DNNs 112 may be achieved by pipelining computations of back-propagation in a parallelized fashion (i.e., simultaneously executing multiple computations) using the multiple multi-core processors 108(1)-108(N). This pipelined back-propagation is an approximation due to the distributions of the layers 114(1)-114(N) of the DNNs 112 across the multiple multi-core processors 108(1)-108(N) to form a pipeline. In the pipeline, data flows sequentially from each multi-core processor to the next multi-core processor, in which all of the multi-core processors 108(1)-108(N) work simultaneously on the received data. However, such data flows may result in pipeline roundtrip delays that affect computation accuracy.

Thus, because of the highly non-linear nature of the training, reasonable convergence (i.e., training completion) may be achieved by performing the stochastic gradient descent, as described above in expression (5), using discretely sized batches of randomly sampled frames 128 from the training data 116. The size of the batches may be limited by the parallelized computation nature of the pipelined algorithm 110. For instance, model updates to the DNNs 112, which involve the exchange of data between multi-core processors, are used for the computation iterations of the algorithm 110. However, model updates across multiple multi-core processors may use a high amount bandwidth during the execution of the pipelined algorithm 110. In one example, the DNNs 112 (with seven hidden layers) may include $10^8$ parameters. In such an example, the processing of a reasonably sized batch of sample frames with respect to the DNNs 112 may translate into the gathering and redistribution of 400 megabyte (MB) worth of gradients and another 400 MB of model parameters by each of the multi-core processors 108(1)-108(N).

In other words, the size of each batch that is used to train the DNNs may be constrained by two factors. The upper constraint for the batch size is the frequency of model updates. Larger batch size for the batches of sample frames 128 may result in less model updates. However, increasing the batch size may result in the loss of computation accuracy, especially during early computation iterations of the pipelined propagation algorithm 110. Such loss of computation accuracy may result in prolonged execution time for the pipelined algorithm 110 to reach convergence, i.e., completes the training of the DNNs 112. In extreme cases, the prolonged execution time may even result in a failure of the pipelined algorithm 110 to reach convergence, i.e., failure to complete the training. The lower constraint for the batch size is the efficiency in the utilization of the multi-core processors. The efficiency in the use of the computation cycles performed by the multi-core processors may decrease as a batch size for the sample frame batches 128 is reduced. Thus, excess reduction in batch size may also lead to inefficiencies that prolong the execution time for the pipelined algorithm 110 to reach convergence.

In practical terms, the batch generation module 216 may configure the batch size for the sample frame batches 128 based on rates of data transfers between the multi-core processors and a number of operations per second that each of the multi-core processors 108(1)-108(N) is capable of executing. For example, given an array of 2-4 GPGPUs that are capable of 2-4 tera floating point operations per second (TFLOPS), and transfer rates of 6 gigabytes (GB)/s between the GPGPUs, the batch size may be in the range of 256 to 1024 sample frames per sample batch. Accordingly, batch size optimization 118 may produce the lowest amount of computation accuracy loss and the smallest amount of efficiency loss.

Generally speaking, the batch generation module 216 may configure a larger batch size when the rates of data transfers for the multi-core processors 108(1)-108(N) are relatively superior to the execution speeds of the multi-core processors 108(1)-108(N). Conversely, the batch generation module 216 may configure a smaller batch size when the execution speeds of the multi-core processors 108(1)-108(N) are relatively superior to the rates of data transfers between the multi-core processors 108(1)-108(N). The batch generation module 216 may partition the training data 116 into randomly sampled frame batches 128 based on the configured batch size.

The algorithm configuration module 218 may modify the pipelined algorithm 110 with the pipeline roundtrip reduction 124 and the data transfer parallelization 126 techniques. The algorithm configuration module 218 may perform each modification based on a corresponding user configuration input. Each of the computation iterations performed by the pipelined algorithm 110 may execute the following steps in sequence: forward propagation of input data, error back propagation, and model update. The forward propagation of the input data is described by the equations (1)-(3), the error back propagation is described by the equation (8), and the model update is described by the expression (5).

However, the pipeline roundtrip reduction 124 modification may cause the pipelined algorithm 110 to perform a model update step before a forward propagation step during one or more of the computation iterations. Each application of pipeline roundtrip reduction 124 may reduce the pipeline roundtrip delay by one batch, which may in turn reduce approximation performed by the pipelined algorithm 110. In turn, the reduction in approximation may increase the execution efficiency of the pipelined algorithm 110.

Further, the data transfer parallelization 126 technique involves the parallelization of data transfer with computation. A first part of the data transfer parallelization 126 may occur after the performance of an error back propagation step. In this part, output data from a computation at a multi-core processor that processes an upper layer may be streamed to another multi-core processor that processes a lower layer of the DNNs 112. Such streaming may be performed in parallel or partially in parallel with a model update step and/or an input data forward propagation step, as the model update step and the forward propagation step use data that is different from the output data.

A second part of the data transfer parallelization 126 may occur after the performance of the input data forward propagation step. In this part, output data from a computation at the multi-core processor that processes the lower layer may be streamed to the multi-core processor that processes the upper layer in the DNNs 112. Such streaming may be performed in parallel or partially in parallel with the computation of an error for another error back propagation step. Thus, since streaming time is generally short than compute time, the use of the data transfer parallelization 126 may reduce or eliminate any time delay resulting from the exchange of data between multiple multi-core processors.

The load balance module 220 may determine whether to perform layer grouping 120. In order to perform layer grouping 120, the load balance module 220 may distribute the layers 114(1)-114(N) of the DNNs 112 between the multi-core processors 108(1)-108(N) in groups for processing by the pipelined algorithm 110. For instance, the layers 114(1)-114(N) may have varying sizes and thus takes varying runtimes to process. Thus, a large layer (such as the top layer 114(N)) may act as a bottleneck that prevents the multi-core processors from processing the other smaller layers during the execution of the pipelined algorithm 110. In other instances in which there are more layers to be processed than multi-core processors, the layer grouping 120 may be used to allocate the layers into groups for processing by the multi-core processors.

For example, the load balance module 220 may assign each of four groups of multiple layers from the layers 114(1)-114(N) to a corresponding multi-core processor, such that the amount of data processed by each of the four multi-core processors for its respective assigned layers is equalized or as equalized as possible. In another example, the load balance module 220 may assign a largest layer to be processed by a first multi-core processor, while assigning the remaining multiple layers to be processed by a second multi-core processor. However, the load balance module 220 may assign each of one or more sets of multiple layers of the layers 114(1)-114(N) to a corresponding multi-core processor in any combination, in order to balance computations performed for the pipelined algorithm 110 between the multi-core processors 108(1)-108(N). Thus, the load balance module 220 may perform layer grouping 120 based on the number of the multi-core processors 108(1)-108(N) and the size of each layer in the DNNs 112. The grouping of multiple layers into a single set for processing may also eliminate pipeline roundtrip delay, thereby increasing the execution efficiency of the pipelined algorithm 110.

The model striping module 222 may determine whether the algorithm execution module 214 is to be configured to perform model striping 122 with respect to the top layer 114(N) of the DNNs 112. Model striping 122 is the parallelization of the processing of a particular layer of the DNNs 112 across multiple multi-core processors, such as the multi-core processors 108(1)-108(N). In various embodiments, the model striping 122 may be applied more frequently to the training of context-dependent DNNs because in context-independent DNNs the top layer size is typically much smaller than that in the context-dependent DNNs. By implementing model striping with respect to the top layer 114(N), the input $v^l$ of the top layer 114(N) may be distributed across the multi-core processors 108(1)-108(N) in forward propagation, in which each of the multi-core processors 108(1)-108(N) may compute a slice of the output vector $E^l\{H^l\}$. The slices may then be distributed to the other multi-core processors of the multi-core processors 108(1)-108(N) for computing the next layer. In back-propagation, error vectors are parallelized as slices, but the resulting matrix products from each slice are partial sums that are further summed up. As a result, in both forward propagation and back propagation, each vector is transferred K−1 times, in which K is the number of the multi-core processors 108(1)-108(N).

In various embodiments, the decision to implement model striping 122 for the top layer 114(N) may be based on a comparison of the size of the top layer 114(N) to a size of at least one other layer in the DNNs 112. The model striping module 222 may detect the size of each layer of the DNNs 112. Accordingly, in one instance, the model striping module 222 may direct the implementation of the model striping 122 when a ratio between a size of the top layer 114(N) and a size of the next largest layer in the DNNs 112 exceeds a predetermined ratio value threshold. For example, model striping 122 may be implemented for the top layer 114(N) when the size of the top layer 114(N) is over ten times larger than the next largest layer in the DNNs 112.

In another instance, the model striping module 222 may direct the implementation of the model striping 122 when a ratio between a size of the top layer 114(N) and a total size of the remaining layers in the DNNs 112 exceeds a predetermined ratio value threshold. For example, model striping 122 may be implemented for the top layer 114(N) when the size of the top layer 114(N) is over four times larger than the total size of the remaining layers in the DNNs 112.

In additional instances, the model striping module 222 may use other predetermined ratio value thresholds to determine whether to implement model striping 122 for the top layer 114(N). For example, the model striping module 222 may compare the size of the top layer 114(N) to an average size of the hidden layers, such as the hidden layers 114(2)-114(4), to produce a ratio value, a size of the smallest layer (e.g., input layer 114(1)) of the DNNs 112 to produce a ratio value or a total size of the hidden layers 114(2)-114(4) produce a ratio value, etc. Accordingly, depending on the particular ratio value used, the model striping module 222 may implement model striping 122 for the top layer 114(N) when the particular ratio value exceeds a corresponding ratio value threshold. The implementation of model striping 122 on the top layer 114(N) may alleviate bottlenecks in the execution of the pipelined algorithm 110 caused by an excessively large top layer 114(N).

The data store 224 may store data that are used by the various modules. In at least one embodiment, the data store may store the training data 116, the DNNs 112, temporary variables and other data used for training the DNNs 112, and the DNNs 130. Each set of data may be stored in a data table, a data array, and/or other data storage structures.

While the multi-core processors 108(1)-108(N) are described as residing on the computing device 106 and connected by the interface bus 204 in the above the embodiments, the multi-core processors 108(1)-108(N) may also reside on different computing devices in other embodiments. In some alternative embodiments, each of the multi-core processors 108(1)-108(N) may reside on a corresponding computing device, and may exchange data through a network via a network interface. The network may be a local area network (LAN), a wide area network (WAN), or a combination of both, such as the Internet. In other alternative embodiments, at least two of the multi-core processors 108(1)-108(N) may reside on different computing devices. In such embodiments, multi-core processors on the same computing device may use an interface bus of the computing device to exchange data, while multi-core processors on different computing devices may exchange data via the network.

Example Processes

Figure 3:
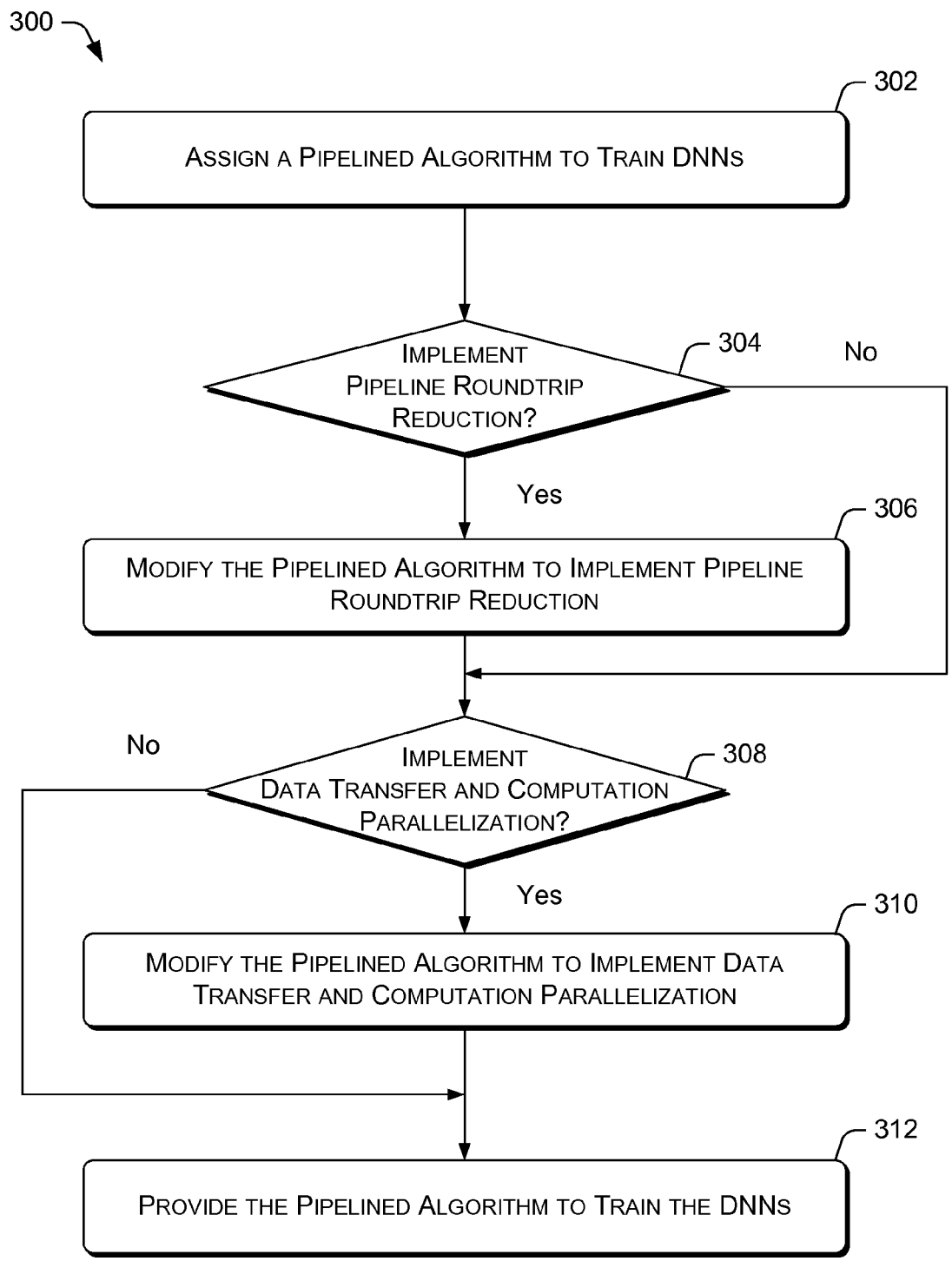
FIG. 3 is a flow diagram that illustrates an example process for modifying the execution order of propagation steps in the execution of a pipelined algorithm to reduce delay due to the exchange of data between multi-core processors.
Figure 4:
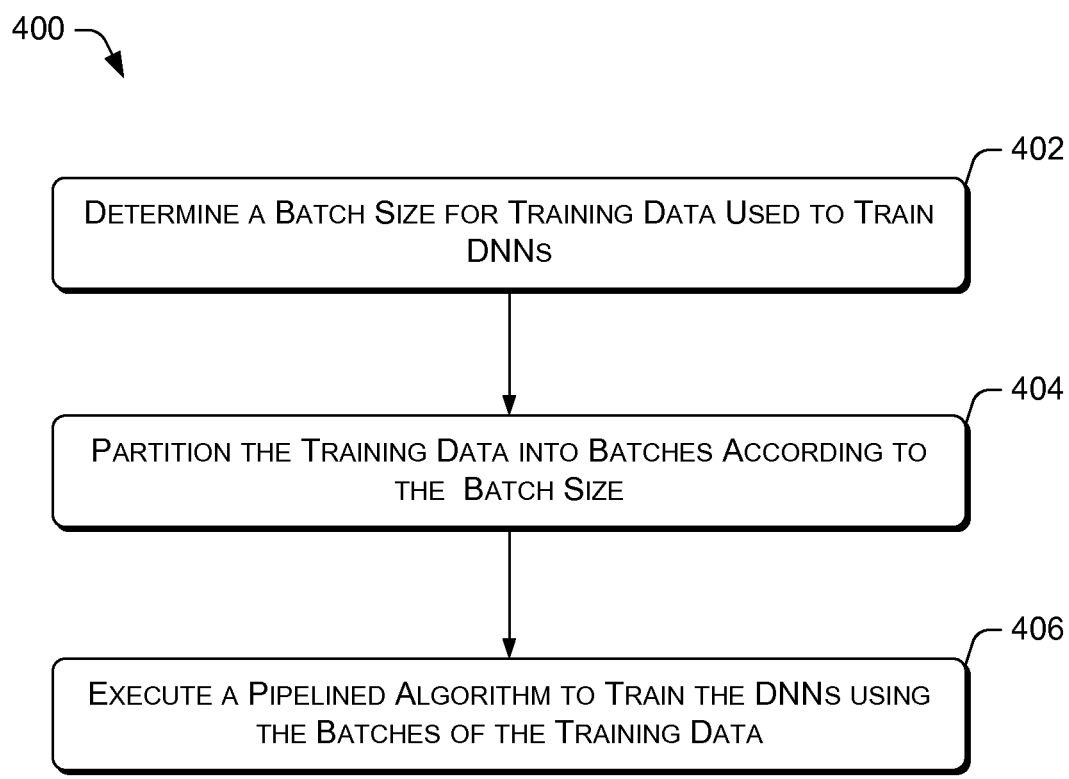
FIG. 4 is a flow diagram that illustrates an example process for configuring the size of batches obtained from training data to reduce training runtime of the DNNs.
Figure 5:
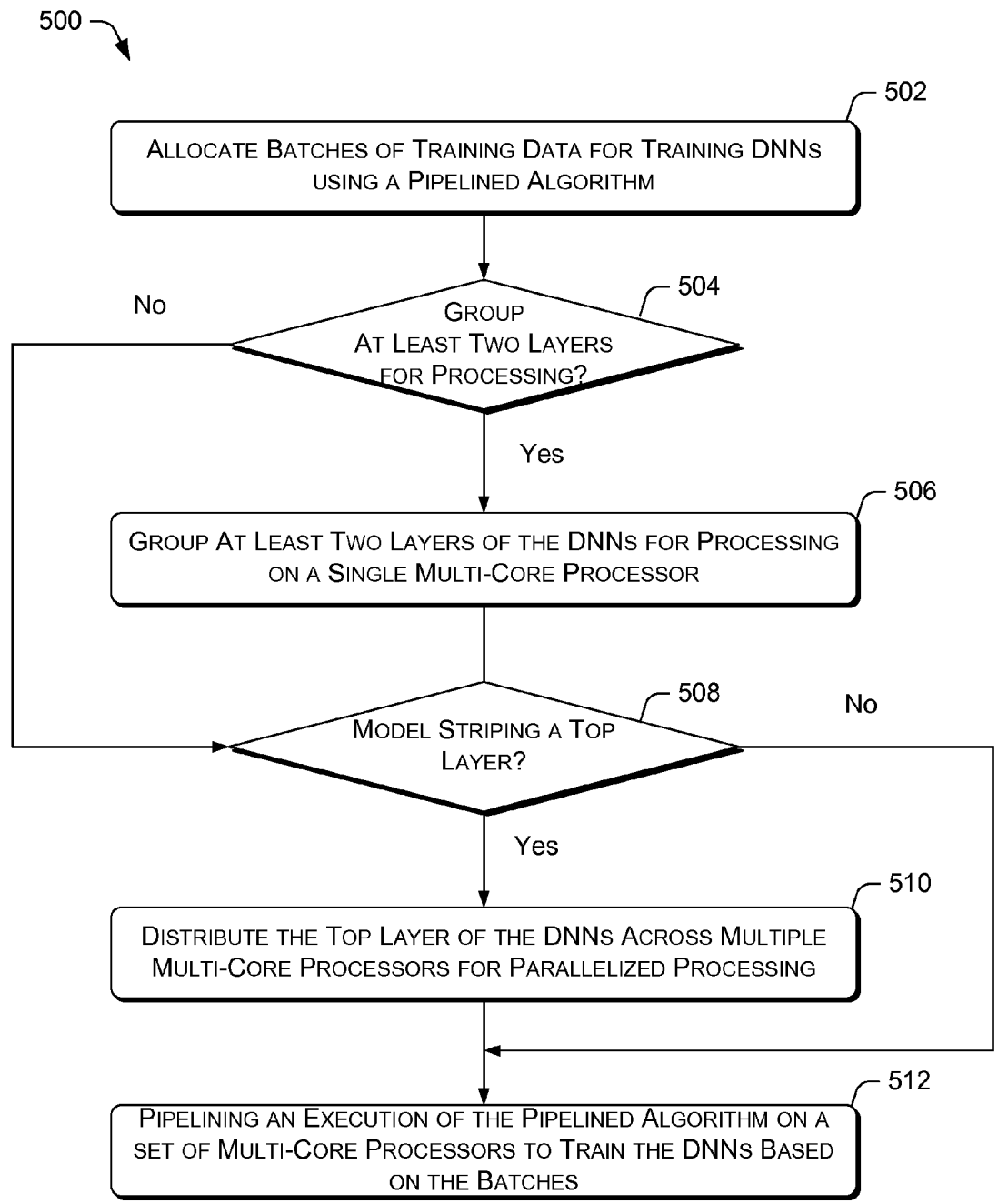
FIG. 5 is a flow diagram that illustrates an example process for load balancing parallelized computations between multiple multi-core processors to reduce training runtime of the DNNs.

FIGS. 3-5 describe various example processes for using a pipelined algorithm to train DNNs for performing data analysis, such as for the purpose of speech recognition. The order in which the operations are described in each example process is not intended to be construed as a limitation, and any number of the described operations may be combined in any order and/or in parallel to implement each process. Moreover, the operations in each of the FIGS. 3-5 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 3 is a flow diagram that illustrates an example process 300 for modifying the execution order of propagation steps in the execution of a pipelined algorithm to reduce delay due to the exchange of data between multi-core processors.

At block 302, the training engine 102 may assign the pipelined algorithm 110 to train the DNNs 112 for performing data analysis. The training of the DNNs 112 may be achieved by pipelining computations of back-propagation in a parallelized fashion (i.e., simultaneously executing multiple computations) using the multiple multi-core processors 108(1)-108(N).

At decision block 304, the training engine 102 may determine whether to implement the pipeline roundtrip reduction 124. The pipeline roundtrip reduction 124 includes configuring the pipelined algorithm 110 to perform a model update step before a forward propagation step during one or more of the computation iterations. In various embodiments, the training engine 102 may determine whether to implement the pipeline roundtrip reduction 124 based on a configuration input from a user. Accordingly, if the training engine 102 implements the pipeline roundtrip reduction 124 ("yes" at decision block 304), then the process 300 may proceed to block 306.

At block 306, the training engine 102 may modify the pipelined algorithm 110 to implement the pipeline roundtrip reduction 124 during execution. The pipeline roundtrip reduction may reduce the pipeline roundtrip delay by one batch for each of the computation iterations performed by the pipelined algorithm 110, which may in turn reduce approximation performed by the pipelined algorithm 110.

At decision block 308, the training engine 102 may determine whether to implement the data transfer parallelization 126. The data transfer parallelization 126 may include parallelizing the streaming of the output data from a computation iteration of the pipelined algorithm 110 with other steps in the computation iteration. In various embodiments, the training engine 102 may determine whether to implement the data transfer parallelization 126 based on a configuration input from a user. Accordingly, if the training engine 102 implements the data transfer parallelization 126 ("yes" at decision block 308), then the process 300 may proceed to block 310.

At block 310, the training engine 102 may modify the pipelined algorithm 110 to implement the data transfer parallelization during execution. Accordingly, since streaming time is generally short than compute time, the configuration of pipelined algorithm 110 to implement the data transfer parallelization 126 may reduce or eliminate any time delay resulting from the exchange of data between multiple multi-core processors during execution. At block 312, the training engine 102 may provide the pipelined algorithm 110 to train the DNNs 112 for performing data analysis, such as speech recognition.

However, returning to decision block 304, if the training engine 102 does not implement the pipeline roundtrip reduction 124 ("no" at decision block 304), then the process 300 may proceed directly to decision block 308. Further, returning to decision block 308, if the training engine 102 does not implement the data transfer parallelization 126 ("no" at decision block 308), then the process 300 may proceed directly to block 312. At block 312, the training engine 102 may provide the pipelined algorithm 110 to train the DNNs.

FIG. 4 is a flow diagram that illustrates an example process 400 for configuring the size of batches 128 obtained from the training data to reduce training runtime of the DNNs. At block 402, the training engine 102 may determine a batch size for partitioning training data 116 (e.g., a speech corpus) that is used to train the DNNs. In at least one embodiment, the training engine 102 may configure the batch size based on rates of data transfers between the multi-core processors and execution speed, i.e., a number of operations per second, of each of the multi-core processors 108(1)-108(N).

For example, the training engine 102 may designate a larger batch size when the rates of data transfers of the multi-core processors 108(1)-108(N) are relatively superior to the execution speeds of the multi-core processors 108(1)-108(N). Conversely, training engine 102 may designate a smaller batch size when the execution speeds of the multi-core processors 108(1)-108(N) are relatively superior to the rates of data transfers between the multi-core processors 108(1)-108(N).

At block 404, the training engine 102 may partition the training data into batches 128 according to the batch size, in which each batch is designed to optimize the tradeoff between computation accuracy and execution efficiency. In various embodiments, each batch may include randomly sampled frames from the training data 116.

At block 406, the training engine 102 may execute the pipelined algorithm 110 to train the DNNs 112 using the batches 128 derived from the training data 116. In various embodiments, the pipelined algorithm 110 may have been modified according to the process 300 described in FIG. 3.

FIG. 5 is a flow diagram that illustrates an example process 500 for load balancing parallelized computations between multiple multi-core processors to reduce training runtime of the DNNs. In at least one embodiment, the process 500 may further describe block 406 of the process 400.

At block 502, the training engine 102 may allocate the batches 128 of sample frames from the training data 116 (e.g., a speech corpus) for training the DNNs 112. The training may be performed using the pipelined algorithm 110.

At decision block 504, the training engine 102 may determine whether to implement the layer grouping 120 to group at least two layers in the DNNs 112 together for processing on a single multi-core processor by the pipelined algorithm 110. In some embodiments, the at least two layers may be at least two consecutive layers. The layer grouping 120 may be performed to load balance computations performed for the pipelined algorithm 110 between the multi-core processors 108(1)-108(N). Thus, the number of groupings and the layers in each grouping may be based on the number of the multi-core processors 108(1)-108(N) and the size of each layer in the DNNs 112. Thus, if the training engine 102 implements the layer grouping 120 ("yes" at decision block 504), then the process 500 may proceed to block 506.

At block 506, the training engine 102 may group at least two layers of the DNNs 112 for processing on a single multi-core processor. In various embodiments, the training engine 102 may group the layers in the DNNs 112 into multiple sets of two or more layers, in which each of the multiple sets may be processed by a corresponding multi-core processor.

At decision block 508, the training engine 102 may determine whether to implement the model striping 122 to distribute the processing of the top layer 114(N) of the DNNs 112 across multiple multi-core processors. In various embodiments, the training engine 102 may make such a determination based on a ratio of the size of the top layer 114(N) to the size of at least one other layer in the DNNs 112. Thus, if the training engine 102 implements the model striping 122 for the top layer 114(N) ("yes" at decision block 508), then the process 500 may proceed to block 510.

At block 510, the training engine 102 may distribute the top layer 114(N) of the DNNs 112 across the multi-core processors 108(1)-108(N) for parallelized processing by the pipelined algorithm 110. However, in other embodiments, the training engine 102 may distribute the top layer 114(N) across a set of multiple multi-core processors other than the multi-core processors 108(1)-108(N), or distribute the top layer 114(N) to a plurality of but less than all of the multi-core processors 108(1)-108(N).

At block 512, the training engine 102 may pipeline an execution of the algorithm 110 on a set of multi-core processors to train the DNNs 112 based on the batches 128 of the training data 116. The set of multi-core processors may include the multi-core processors 108(1)-108(N). The pipelined algorithm 110 that is executed may be configured through the process 300 shown in FIG. 3 The training may produce the trained DNNs 112 that are used for a performing data analysis, such as speech recognition.

However, returning to decision block 504, if the training engine 102 does not implement the layer grouping 120 ("no" at decision block 504), then the process 500 may proceed directly to decision block 508. Further, at decision block 508, if the training engine 102 does not implement the model striping 122 for the top layer 114(N) ("no" at decision block 508), then the process 500 may proceed directly to block 512. Once again, at block 512, the training engine 102 may pipeline an execution of the algorithm 110 on a set of multi-core processors to train the DNNs 112 based on the batches 128 of training data 116.

The training techniques described herein may reduce the amount of time used to train DNNs for a particular purpose, such as for speech recognition. The decreased training time may lead to an increase in the implementation and usage of the DNNs in performing speech-to-text transcription or text-to-speech synthesis.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A system comprising:
one or more processors; and
one or more computer storage media storing computer-executable instructions that are executable to cause the one or more processors to perform acts comprising:
providing a pipelined algorithm to train deep neural networks (DNNs) for performing data analysis based on training data, the DNNs being one of context-dependent DNNs or context-independent DNNs;
partitioning the training data into sample batches of a specific batch size based on rates of data transfers between the one or more processors for executing the pipelined algorithm and an execution speed of each of the one or more processors; and
pipelining an execution of the pipelined algorithm on the DNNs through the one or more processors to train the DNNs using the sample batches.

2. The system claim 1, further comprising grouping at least two consecutive layers of DNNs for processing on a single processor of the one or more processors by the pipelined algorithm.

3. The system of claim 1, further comprising distributing a top layer of the DNNs across multiple processors of the one or more processors for parallelized processing by the pipelined algorithm through model striping.

4. The system of claim 1, wherein the specific batch size maximizes computation accuracy for reaching convergence and execution efficiency of the pipelined algorithm in training the DNNs.

5. The system of claim 1, wherein the one or more processors include multi-core general-purpose graphics processing units (GPGPUs) that exchange data through a peripheral component interconnect express (PCIe) bus of a computing device.

6. The system of claim 1, wherein the one or more processors include field programmable gate arrays (FPGAs) that exchange data through an internal bus of a computing device.

7. The system of claim 1, wherein the pipelining includes executing a model update prior to an input data forward propagation in a computation iteration of the pipelined algorithm.

8. The system of claim 1, wherein the DNNs include multiple layers, and wherein the pipelining includes streaming output data from a computation at a first processor of the one or more processors that processes an upper layer to a second processor of the one or more processors that processes a lower layer following a performance of an error back propagation step of a computation iteration, the streaming of the output data occurring at least partially in parallel with one or more of an model update or an input data forward propagation.

9. The system of claim 8, wherein the pipelining further includes streaming additional output data from a computation at the second processor of the one or more processors that processes the lower layer to the first processor of the one or more processors that processes the upper layer following the input data forward propagation, the streaming of the additional output data occurring at least partially in parallel with a computation of an error for another error back propagation.

10. A computer-implemented method, comprising:
providing a pipelined algorithm to train deep neural networks (DNNs) for performing data analysis based on training data, the DNNs being one of context-dependent DNNs or context-independent DNNs and including multiple layers;
determining that a ratio between a size of a top layer and a size of one or more of the multiple layers exceeds a predetermined threshold;
based at least in part on the determining, distributing the top layer of the DNNs across multiple processors through model striping for parallelized processing by the pipelined algorithm; and
pipelining an execution of the pipelined algorithm on the DNNs through the multiple processors to train the DNNs using sample batches of the training data.

11. The computer-implemented method of claim 10, further comprising partitioning the training data into the sample batches having a specific batch size based on rates of data transfers between the multiple processors for executing the pipelined algorithm and an execution speed of each of the multiple processors.

12. The computer-implemented method of claim 10, further comprising grouping at least two layers of the DNNs for processing on a single processor of the multiple processors by the pipelined algorithm.

13. The computer-implemented method of claim 10, wherein the distributing includes distributing the top layer in response to a determination that a ratio of a size of the top layer to a size of another layer or an average size of multiple layers in the DNNs exceeds a ratio threshold.

14. The computer-implemented method of claim 10, wherein the providing includes providing the pipeline algorithm to train a combination of the context-dependent DNNs and hidden Markov models (HMMs) for performing speech recognition.

15. The computer-implemented method of claim 10, wherein the pipelining includes executing a model update prior to an input data forward propagation in a computation iteration of the pipelined algorithm.

16. A system, comprising:
a plurality of processors;
a memory that includes a plurality of computer-executable components that are executable by the plurality of processors, comprising:
a batch generation component that partitions training data into sample batches of a specific batch size; and
an algorithm execution component that pipelines an execution of a pipelined algorithm through the plurality of processors to train deep neural networks (DNNs) using the sample batches, the execution including executing a model update prior to an input data forward propagation in a computation iteration of the pipelined algorithm, the DNNs being one of context-dependent DNNs or context-independent DNNs, wherein the algorithm execution component trains the DNNs based at least in part on performing gradient descent techniques, wherein the DNNs include multiple layers, and wherein the execution further includes streaming output data from a computation at a first processor of the plurality of processors that processes an upper layer to a second processor of the plurality of processors that processes a lower layer following a performance of an error back propagation of the computation iteration, the streaming of the output data occurring at least partially in parallel with one or more of the model update or the input data forward propagation.

17. The system of claim 16, wherein the execution further includes streaming additional output data from an additional computation at the second processor that processes the lower layer to the first processor that processes the upper layer following the input data forward propagation, the streaming of the additional output data occurring at least partially in parallel with a computation of an error for another error back propagation.

18. The system of claim 16, wherein the batch generation component partitions the training data into the sample batches of the specific batch size based on rates of data transfers between the plurality of processors and an execution speed of each of the plurality of processors.

19. The system of claim 16, further comprising a load balance component that at least one of groups multiple layers of the DNNs for processing on a single processor of the plurality of processors by the pipelined algorithm, or distributes a top layer of the DNNs across multiple ones of the plurality of processors through model striping for parallelized processing by the pipelined algorithm.

20. The system of claim 16, further comprising a load balance component that groups a first layer and a second layer of the multiple layers of the DNNs based at least in part on a number of the plurality of processors.

* * * * *